(12) United States Patent
Scherrer

(10) Patent No.: US 6,612,635 B1
(45) Date of Patent: Sep. 2, 2003

(54) STORAGE SYSTEM FOR A VEHICLE BED

(76) Inventor: Robert Scherrer, 1210 Icehouse Ave., Sparks, NV (US) 89431

( * ) Notice: Subject to any disclaimer, the term of this patent is extended or adjusted under 35 U.S.C. 154(b) by 0 days.

(21) Appl. No.: 10/267,881

(22) Filed: Oct. 10, 2002

(51) Int. Cl.[7] .............................................. B65G 67/02
(52) U.S. Cl. ........................................ 296/61; 414/537
(58) Field of Search .................. 296/61; 414/537; 14/71.1

(56) References Cited

U.S. PATENT DOCUMENTS

| | | | |
|---|---|---|---|
| 3,870,170 A | * | 3/1975 | Noble et al. ................ 414/537 |
| 4,601,632 A | * | 7/1986 | Agee ........................... 414/537 |
| 5,133,634 A | * | 7/1992 | Gingrich et al. ............. 414/537 |
| 5,199,150 A | * | 4/1993 | Mortenson .................... 29/436 |
| 5,795,125 A | * | 8/1998 | Walkden ...................... 414/537 |

\* cited by examiner

*Primary Examiner*—Joseph D. Pape
(74) *Attorney, Agent, or Firm*—Theodore J. Bielen, Jr.

(57) ABSTRACT

A system for storing items on a vehicle bed utilizing a platform fixed relative to the walls of the bed. The platform is spaced from the bottom of the vehicle bed to from a chamber. First and second tracks connect to the platform within the chamber. A ramp slidingly moves along the track into a first position where the ramp rests on the ground surface or into a second position where the ramp lies in the chamber. The gate connected to the ramp closes the chamber in the truck bed beneath the ramp.

13 Claims, 3 Drawing Sheets

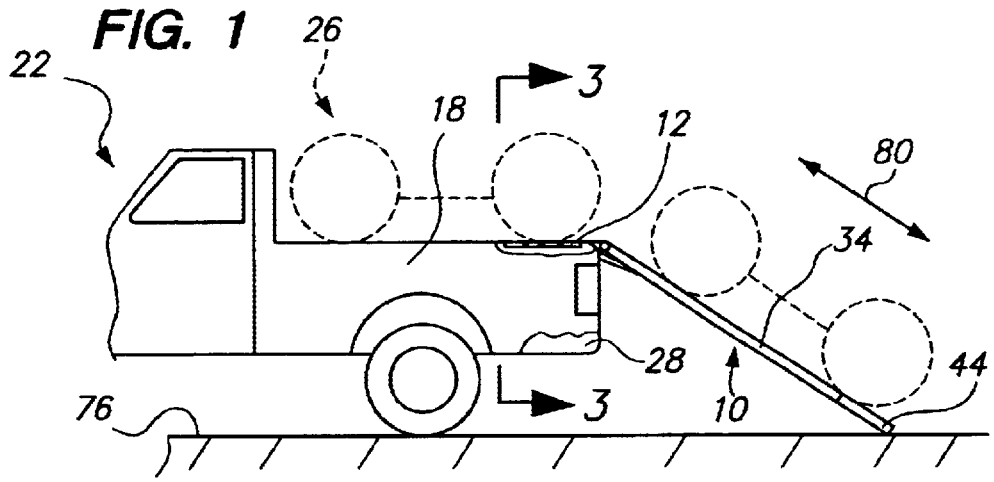
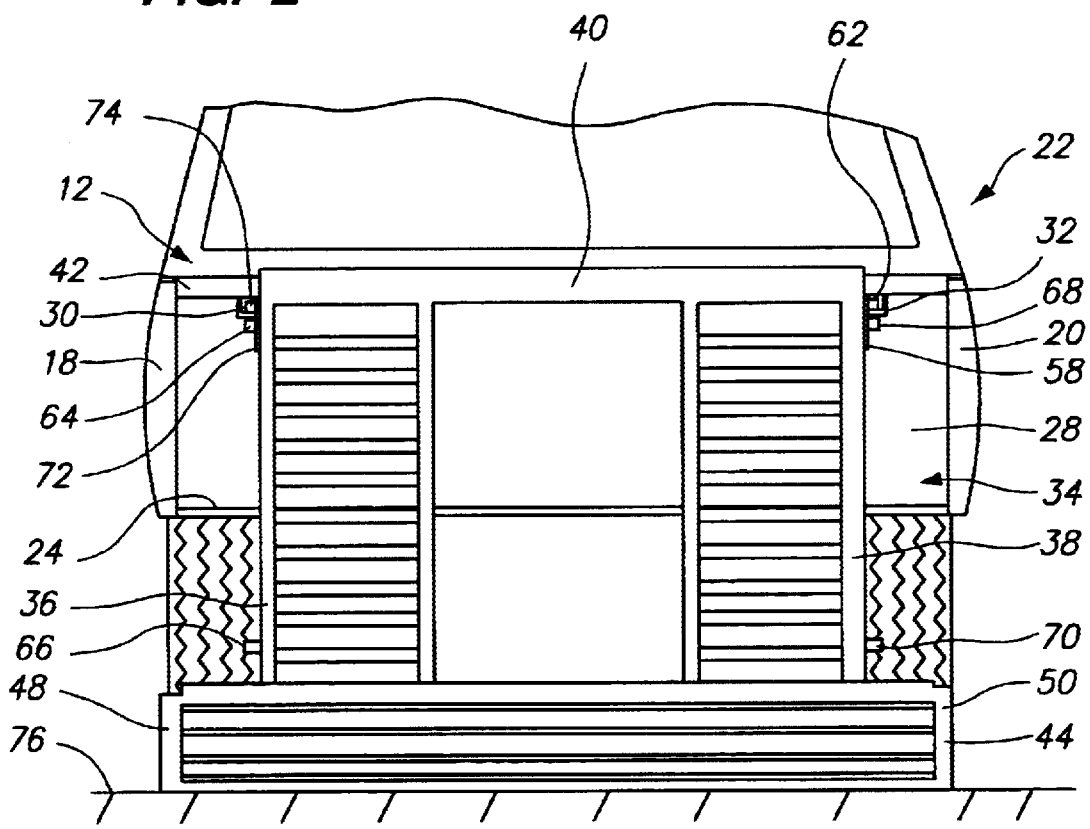

STORAGE SYSTEM FOR A VEHICLE BED

BACKGROUND OF THE INVENTION

The present invention relates to a novel and useful vehicle storage system.

Off road vehicles (ORVs) are usable oh terrain which is generally found in remote areas. In the past, persons have transported ORVs or four wheelers to these remote areas by the use of trailers. In certain cases, ramps have been used to run such ORVs into the bed of a pickup truck where the ORV is then transported for use. In either of the above cases, the ORV requires special equipment. Where the ORV is placed in the bed of a pick up truck, equipment space is normally unavailable to the user of the ORV since it is occupied by the ORV. Moving such equipment requires a separate vehicle or a trailer to transport the same. Such equipment items are normally in the form of camping equipment such as tents, lanterns, sleeping bags, and the like.

A vehicle storage system which accommodates an ORV and also provides storage for auxiliary equipment would be a notable advance in the vehicle accessory field.

BRIEF SUMMARY OF THE INVENTION

In accordance with the present invention a novel and useful vehicle storage system for conversion of a vehicle bed is herein provided.

The storage system of the present invention utilizes a platform fixed relative to the first and second walls of a bed of a vehicle. Such vehicle may take the form of a pickup truck having an open bed, although, the bed may be enclosed in certain cases. Such platform may be welded, bolted, or otherwise fixed to the walls of the vehicle and be spaced from the bottom of the vehicle bed to form a chamber. The platform may include tie downs, posts, or barriers, as needed to transport an item, such as an ORV thereupon. A set of tracks are connected relative to the platform within the chamber formed by the platform. Preferably, the tracks are fixed to the platform itself such that they extend along the length of the bed of the vehicle. Moreover, the tracks may be positioned such that the open faces of the same lie in opposition to one another within the chamber formed by the platform.

A ramp is also employs as part of the storage system of the present invention. The ramp may take the form of first and second elongated elements which are sized to slidingly engage the first and second tracks, respectively. The ramp may take the form of a continuous member or a pair of members each of which is capable of accommodating the tire of an ORV. In this regard, each of the ramp elements may be structured with a ladder-like configuration in order to support an ORV in its travel from a position adjacent a vehicle to a position atop of the platform of the system of the present invention.

Means is also included for pivotally linking the ramp to the platform. Such means permits the platform to move from a first position, resting on and extending from the platform or the track connected to the platform, to a second position where the first and second elongated elements of the platform move along the first and second tracks such that the ramp lies within the chamber formed by the platform. Such means may also include at least one arm, and preferably a pair of arms pivotally connected to the first and second elements, respectively, of the ramp. Each arm would include a glide or roller for engaging the requisite fixed track. In addition, the ramp may further comprise an end portion which removably engages a support member of the ramp. Disengagement of the end portion of the ramp from the ramp support member would permit rotation of the ramp first and second elements to a position generally parallel to the arms pivotally connected to the ramp. In this manner, the arms and the first and second elements of the ramp may be held by the first and second tracks fixed relative to the ramp in the truck bed when the ramp is moved into its second position within the chamber.

In addition, the system of the present invention may include a gate which is hinged to the ramp at the portion of the ramp most distal from the platform when the ramp is in its first position. In the case where a gate is used with the ramp of the present invention, the gate serves to contact the ground surface when the ramp lies in its extended first position. Upon movement of the ramp into the chamber formed by the platform, the ramp's second position, the gate may swing downwardly and enclose the chamber formed by the platform. It should be realized that the upper part of the platform may be employed to support an ORV, while the chamber below the ORV may be employed to store equipment.

It may be apparent that a novel and useful vehicle storage system for a vehicle bed has been hereinabove described.

It is therefore an object of the present invention to provide a vehicle storage system which is capable of supporting an ORV and providing a chamber for equipment simultaneously.

Another object of the present invention is to provide a vehicle storage system for a vehicle bed which is easily adapted to conventional vehicles having an open or closed bed.

Yet another object of the present invention is to provide a vehicle storage system for a vehicle bed which includes a movable ramp that permits an ORV to be moved upwardly and downwardly from the platform and which is hidden or concealed when the ORV has been secured.

Another object of the present invention is to provide a vehicle storage system for a vehicle bed in which a movable ramp is used in conjunction with a platform to form a chamber that may be enclosed by a gate hingedly attached to the platform.

Another object of the present invention is to provide a vehicle storage system for a vehicle bed which is simple and safe in its use.

The invention possesses other objects and advantages especially as concerns particular characteristics and features thereof which will become apparent as the specification continues.

BRIEF DESCRIPTION OF THE SEVERAL VIEWS OF THE DRAWING

FIG. 1 is a partial side schematic elevational view depicting the storage system of the present invention.

FIG. 2 is a partial rear view of the storage system with the ramp in its first position, as depicted schematically in FIG. 1.

For a better understanding of the invention reference is made to the following detailed description of the preferred embodiments thereof which should be referenced to the prior described drawings.

DETAILED DESCRIPTION OF THE PREFERRED EMBODIMENTS OF THE INVENTION

Various aspects of the present invention will evolve from the following detailed description of the preferred embodiments of the invention which is best referenced to the hereinabove-delineated drawings.

Figure 5:
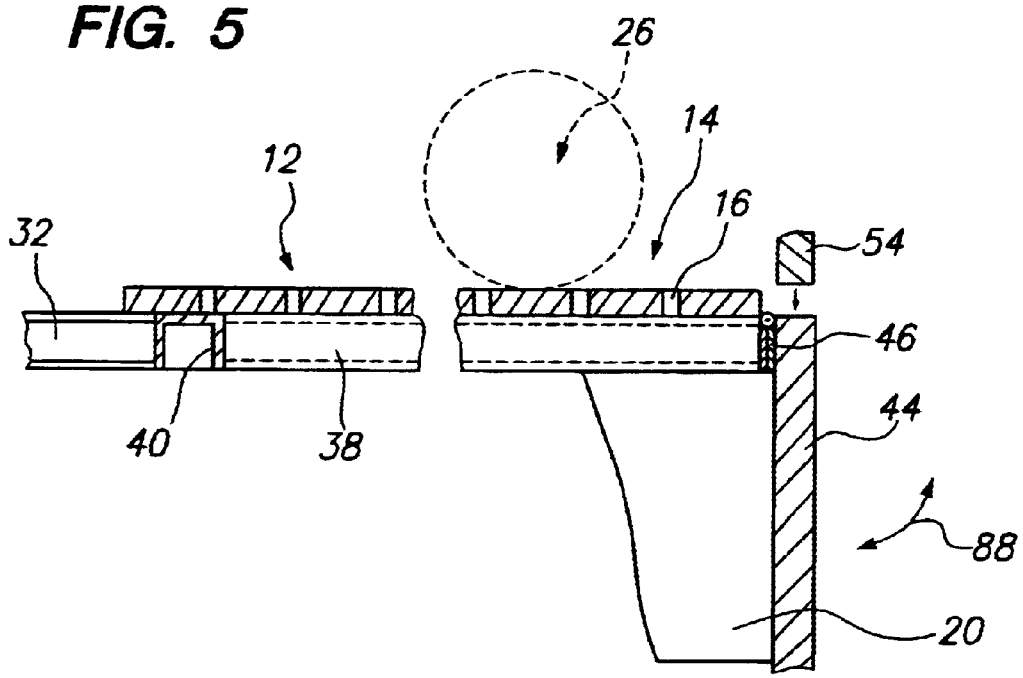
FIG. 5 is a view similar to FIG. 4 in which the ramp has been moved into its second position within the chamber formed in the bed of the vehicle.

A preferred embodiment of the invention is shown in the drawings and denoted by reference character 10. System 10 includes as one of its elements a platform 12. Platform 12 may include a plurality of planks or bars 14 welded or otherwise fixed to a pair of end members, such as end member 16, FIG. 5. Platform 12 is itself fixed relative to sidewalls 18 and 20 of vehicle 22 by any suitable means. For example, platform 12 may be welded or bolted directly to sidewalls 18 and 20. Sidewalls 18 and 20 generally extend from bed 24 of vehicle 22. It should be noted that bed 24 may be enclosed or be in the open configuration as shown in the drawings. Platform 12 is capable of supporting an off-road vehicle 26, shown schematically in FIG. 1. When in place, platform 22 forms a chamber 28 in conjunction with sidewalls 18 and 20 and bed 24 of vehicle 22.

Tracks 30 and 32 are fixed or connected relative to platform 12 and lie within chamber 28. As depicted in the drawings, tracks 30 and 32 are connected directly to platform 12.

Figure 6:
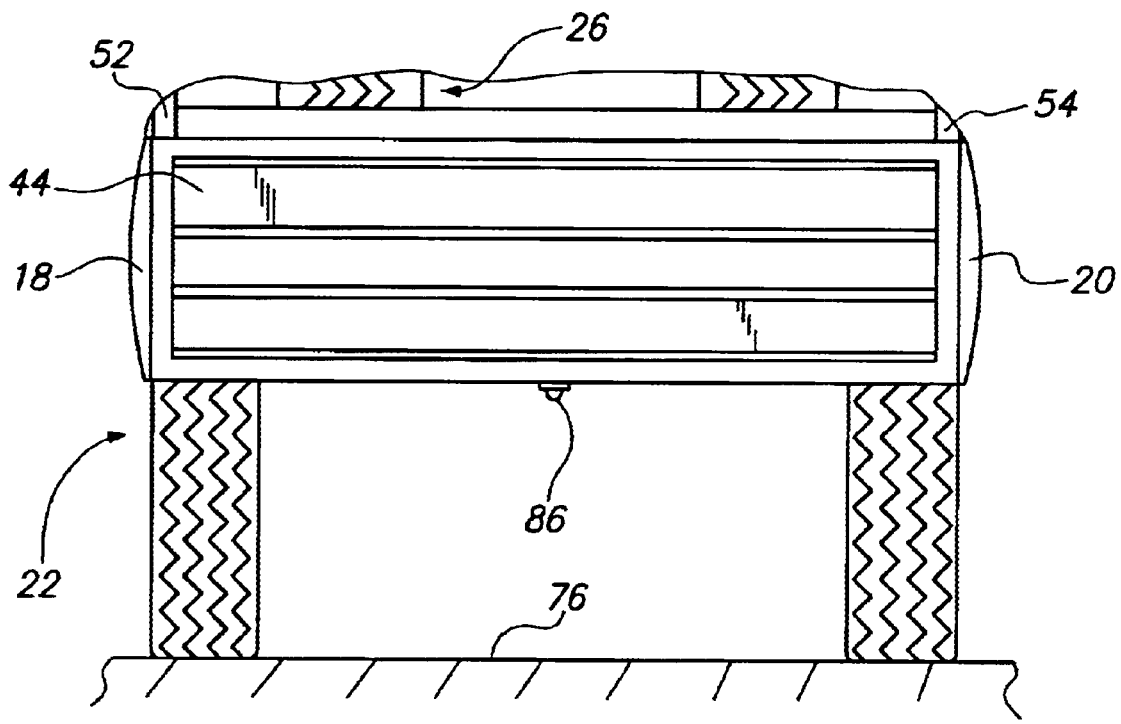
FIG. 6 is a partial rear elevational view of the system of the present invention where the ramp is located in the chamber formed by the platform and the gate has been lowered into its closed position.

System 10 is also provided with a ramp 34 which is capable of moving into and out of chamber 28. Ramp 28 includes first elongated element 36 and a second elongated element 38. Elongated elements 36 and 38 are generally in the form of ladder-like structures. Elements 36 and 38 connect to an end portion 40 which is hook-shaped. End member 40 fits over a spanning support 42 which is fixed to walls 18 and 20 of vehicle 22 and is preferably connected to platform 12 to gain additional strength. Ramp 34 is movable from a first position, depicted in FIG. 1 as extending from vehicle 22, to a second position FIGS. 5 and 6 where ramp 34 lies within chamber 28. A gate or door 44 is hingedly attached to ramp 34 by piano hinge 46. Gate or door 44 also serves as a portion of ramp 34 when ramp 34 is extended into its first position. Ramp 44 includes hollow structural members 48 and 50 which are capable of holding stanchions 52 and 54 to provide a barrier or tie-down to secure vehicle 26 in place.

Figure 3:
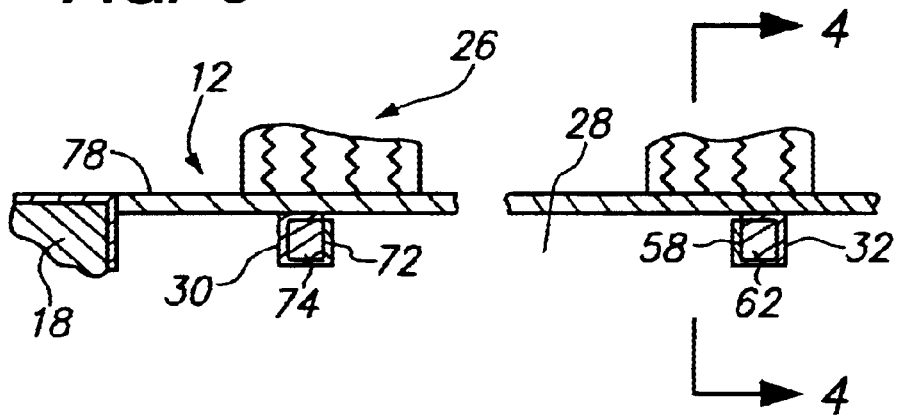
FIG. 3 is a broken sectional view taken along line 3—3 of FIG. 1.
Figure 4:
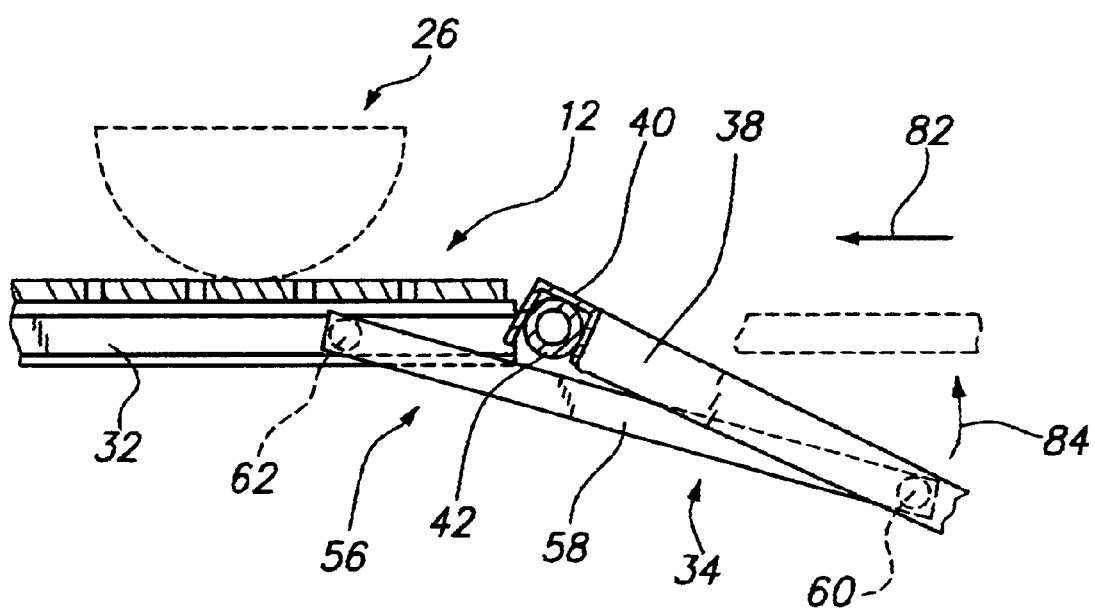
FIG. 4 is a sectional view taken along line 4—4 of FIG. 3.

Means 56 is also found in the present invention for rotatably linking ramp 34 to tracks 30 and 32. With reference to FIG. 4, it may be observed that means 34 includes an arm 58 which pivotally connects to ramp element 38 at pivot 60. Arm 58 is formed with a glide or roller 62 which fits within track 32. In addition, ramp elements 38 and 40 include glides or rollers 64, 66, 68, and 70. It should also be seen that although arm 58 is depicted in detail in FIG. 4, another arm 72 with respect to ramp element 36 is similarly constructed and operates in conjunction with track 30. It should be noted that arm 58 and ramp element 38 are capable of lying parallel to one another such that glides 62, 68, and 70 are capable of riding within track 32. The same situation exists with respect to arm 72 and glides 64 and 66 of ramp element 36 as well as glide 74 on arm 72.

In operation, the user moves ramp 34 from chamber 28 formed by platform 12 above truck bed 34. Ramp 34 is then placed in the first position, FIG. 1 such that gate 44 contacts ground surface 76. At this point, ramp end portion 40 hooks over spanning support 32 and arms 58 and 72 are rotated relative to ramp 34 as shown in FIG. 4 with respect to element 38 of ramp 34. ORV 26 may then be directed along elements 36 and 38 of ramp 34 and onto the top surface 78 of platform 12, directional arrow 80. ORV 26 is then secured to platform 12 using tie down points such as those afforded by stanchions 52 and 54. Ramp 34 may change its first position, FIG. 1 to its second position, FIGS. 5 and 6 by unhooking end portion 40 from spanning member 42, and pulling ramp 34 outwardly from tracks 30 and 32 slightly. Ramp 34 is then rotated downwardly slightly into a position parallel to arms 58 and 72 and pushed into tracks 30 and 32 such that glides 64, 66, 68, and 70 engage tracks 30 and 32, directional arrow 82 of FIG. 4. Directional arrow 84 of FIG. 4 in the phantom rendition at the terminus thereof indicates the movement of arm 58 and ramp element 38. Ramp 34 is then pushed into chamber 38 by moving elements 36 and 38 along tracks 30 and 32, via glides 64, 66, 68 and 70. When ramp 34 has been completely positioned within chamber 28, gate 44 is rotated downwardly, FIG. 5, to enclose chamber 28. Gate 44 may be lifted to place equipment and other items to be stored within chamber 28. Latch 86 is employed when gate 44 is again rotated downwardly, directional arrow 88 of FIG. 5, latch 86 is used to secure gate 44 to the bottom portion of bed 24 of vehicle 22.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A vehicle storage system for a vehicle bed having a bottom and first and second sidewalls extending therefrom, comprising:
   a. a platform fixed relative to the first and second walls of the bed of the vehicle said platform being spaced from the bottom of the vehicle bed to form a chamber;
   b. first and second tracks connected relative to said platform within said chamber;
   c. a ramp, said ramp possessing first and second elongated elements sized for sliding accommodation in said first and second tracks respectively; and
   d. means for rotatably linking said ramp to said platform, said platform being movable from a first position resting on and extending from said platform, to a second position where said first and second elongated elements slidingly engage said first and second tracks, respectively, and said ramp lies in said chamber.

2. The system of claim 1 in which said ramp further comprises a plurality of glides connected to said first and second elements of said ramp said plurality of glides frictionally engaging said first and second tracks.

3. The system of claim 1 in which said platform further comprises a support member essentially spanning the vehicle bed.

4. The system of claim 3 in which said ramp further comprises an end portion removably engaging said support member.

5. The system of claim 1 in which said means for rotatably linking said ramp to said platform further comprises at least one arm selectively pivotally connected to said first and second elements of said ramp.

6. The system of claim 5 in which said at least one arm includes a glide for engaging said first track.

7. The system of claim 1 which further comprises a gate rotatably connected to said ramp.

8. The system of claim 7 in which said ramp further comprises a plurality of glides connected to said first and second elements of said ramp said plurality of glides frictionally engaging said first and second tracks.

9. The system of claim 7 in which said platform further comprises a support member essentially spanning the vehicle bed.

10. The system of claim 9 in which said ramp further comprises an end portion removably engaging said support member.

11. The system of claim 7 in which said means for rotatably linking said ramp to said platform further comprises at least one arm selectively pivotally connected to said first and second elements of said ramp.

12. The system of claim 11 in which said at least one arm includes a glide for engaging said first track.

13. The system of claim 7 which further comprises a gate rotatably connected to said ramp.

* * * * *